Nov. 10, 1959  LE ROI E. HUTCHINGS  2,912,473
FRACTIONATION PROCESS USING ZEOLITIC MOLECULAR SIEVES
Filed Sept. 19, 1957  4 Sheets-Sheet 1

INVENTOR.
LEROI E. HUTCHINGS
BY
ATTORNEY

Nov. 10, 1959   LE ROI E. HUTCHINGS   2,912,473
FRACTIONATION PROCESS USING ZEOLITIC MOLECULAR SIEVES
Filed Sept. 19, 1957   4 Sheets-Sheet 2

INVENTOR.
LEROI E. HUTCHINGS
BY Edward N Lang
ATTORNEY

United States Patent Office 2,912,473
Patented Nov. 10, 1959

2,912,473

FRACTIONATION PROCESS USING ZEOLITIC MOLECULAR SIEVES

Le Roi E. Hutchings, Crystal Lake, Ill., assignor to The Pure Oil Company, Chicago, Ill., a corporation of Ohio Application September 19, 1957, Serial No. 684,931

12 Claims. (Cl. 260—676)

This invention relates to the fractionation of hydrocarbon mixtures consisting predominantly of paraffinic hydrocarbons. The invention is more particularly concerned with the recovery of branched-chain, paraffinic hydrocarbons from the reaction effluent produced in the isomerization of light petroleum distillates boiling within the gasoline range, as well as the recovery of these branched-chain, paraffinic hydrocarbons from the light, petroleum-distillate feed-stocks employed in the isomerization process.

Mixtures of branched-chain and straight-chain paraffinic hydrocarbons such as those employed as the feed stock in the upgrading of light petroleum distillates to produce high octane number blending stocks by treatment in an isomerization process, or obtained as reaction effluent from an isomerization process, are fractionated in accordance with this invention to separate the branched-chain hydrocarbons from the straight-chain hydrocarbons by means of a selective adsorption technique employing a zeolite as the absorbent, and a manipulative technique in which high thermal efficiency is obtained. In carrying out the process of this invention, a plurality of adsorption towers are used. While one tower is in adsorption service, interstitial isomeric materials are being displaced from another tower, a third tower is being desorbed, and a fourth tower is being cooled in preparation for re-use in adsorption service. In the process of this invention, regeneration of the zeolite adsorbent is effected by means of a heated liquid having a multifunctional effect and which is employed as a desorption and displacing oil. The flow of this liquid is controlled in accordance with this invention to effect appreciable savings in the amount of heat required to effect the regeneration of the zeolite adsorbent at an elevated temperature.

Because of the demand for high octane number gasolines for use as motor fuels in high-speed, high-output internal combustion engines, isomerization has become an important unit process in an integrated refining operation for the production of high-octane gasoline. Isomerization of paraffins is a reversible first-order reaction limited by thermodynamic equilibria. In order to obtain maximum efficiency, therefore, it is necessary for the feed stock which is employed to be as free from branched-chain, paraffin hydrocarbons as is possible. It is apparent that the use of pure, straight-chain, paraffinic hydrocarbon feed stocks has been economically unfeasible in the isomerization process. Accordingly, feed stocks which are employed generally consist of low-boiling fractions, boiling in the gasoline range, which are predominantly straight-chain, paraffin hydrocarbons. In this low-boiling fraction, however, there are sufficient proportions of branched-chain, paraffin hydrocarbons to deleteriously affect the conversion rate of the reaction and require an uneconomical recycle ratio. Another disadvantage arising from the equilibrium isomerization reaction is the presence of straight-chain, paraffin hydrocarbons in the reaction effluent. Because these straight-chain hydrocarbons do not beneficially contribute to the improvement in overall octane number, which is the objective of the isomerization process when employed in the upgrading of low octane number feed stocks, it is desirable to effect their removal in order to provide isomerization blending stocks which predominantly contain branched-chain hydrocarbons. Although these separations can be made employing conventional fractional distillation equipment, fractionation processes of this nature employ expensive and complex equipment. Recent developments in the field of so-called "molecular sieves" have made the application of this type of adsorbent commercially practical for use in industrial processes.

It is, therefore, the primary objective of this invention to provide a fractionation process for the selective adsorption of normal paraffinic hydrocarbons from branched-chain paraffinic hydrocarbons employing zeolite-type adsorbents. It is another object of this invention to provide a selective adsorption process for the treatment of low-boiling-range fractions containing predominantly of straight-chain paraffin hydrocarbons in admixture with branched-chain, paraffinic hydrocarbons for the preparation of feed stocks in isomerization processes employed in the upgrading of low-boiling hydrocarbon fractions. It is another object of this invention to process the reaction effluent from an isomerization process employing a low-boiling hydrocarbon fraction boiling within the gasoline range to recover branched-chain hydrocarbon fractions of enhanced octane number. These and other objects will become more apparent from the following detailed description of this invention.

The adsorbing action of natural and artificial zeolites is well documented in the prior art. For example, Barrer in U.S. Patent 2,306,610 reviews to a considerable extent the periodical and patent literature relating to the effectiveness of zeolites as adsorbents for the selective adsorption of straight-chain hydrocarbons. Although naturally-occurring zeolites have properties which make them suitable as adsorbents for this particular purpose, the limited availability of these natural zeolites restricts their widespread application in the industry. Industrial research, however, has provided a synthetic zeolite which can be obtained in sufficient quantities to permit the utilization of these adsorbents in practical commercial processes because they can be synthesized from readily available materials and are available at economical prices. One of the principal advantages of the artificial zeolites for use in adsorption processes is the facility with which these materials can be regenerated for re-use. The regeneration of these adsorbents is effected by driving off the adsorbed material by heating and purging. In general, there are three steps to the regeneration cycle: heating the adsorbent, purging, and then cooling the adsorbent. In regeneration cycles described in the prior art the desorbing material has been used in the form of a gas. According to this invention, it has been found that in the desorption of straight-chain paraffinic hydrocarbons, and the recovery of branched-chain paraffinic hydrocarbons, the use of a liquid desorbing material permits the attaining of high thermal efficiency not otherwise obtained in the use of gaseous desorbents. In order to employ the liquid desorbing materials in accordance with this invention, it is necessary to employ a specific manipulative technique especially adaptable for use with liquid desorbing materials.

The apparatus shown in Figures 1 to 4 comprises a plurality of adsorption towers, 10A—10D, each containing a bed of the synthetic zeolite adsorbent. These towers are fitted with suitable inlet lines 11. The effluent from each of the towers is removed by overhead outlet lines 12. Complementary equipment employed in conjunction with the adsorption towers are stripping units 13 and 14, one of which, 13, is utilized in processing the hydrocarbon fractions containing the branched-chain hydrocarbons, and the other of which, 14, is used in stripping normal paraffins from the heating and cooling oils used in the process. The regeneration system comprises a hot oil storage unit, 15, with its auxiliary equipment such as pump 16 and heat exchanger 17; and a cold oil storage unit, 18, which utilizes auxiliary equipment including pump 19 and heat exchanger 20. In order to employ the illustrative apparatus in a continuous type of process, it is obvious that a piping manifold system must be provided to switch the various fluid streams when each of the towers is being employed alternatively during the adsorption, displacing, desorption, and cooling phases of the complete processing cycle. In order to simplify a discussion of the manipulative technique of this invention, however, this manifold system is eliminated from the apparatus schematically shown in the attached drawing. Therefore, for simplicity purposes the drawing does not show other pumps, heat exchangers, valves, by-passes or other auxiliary equipment, the proper placement of which will be at once evident to those skilled in the art from the following description of the process of this invention.

Figure 1:
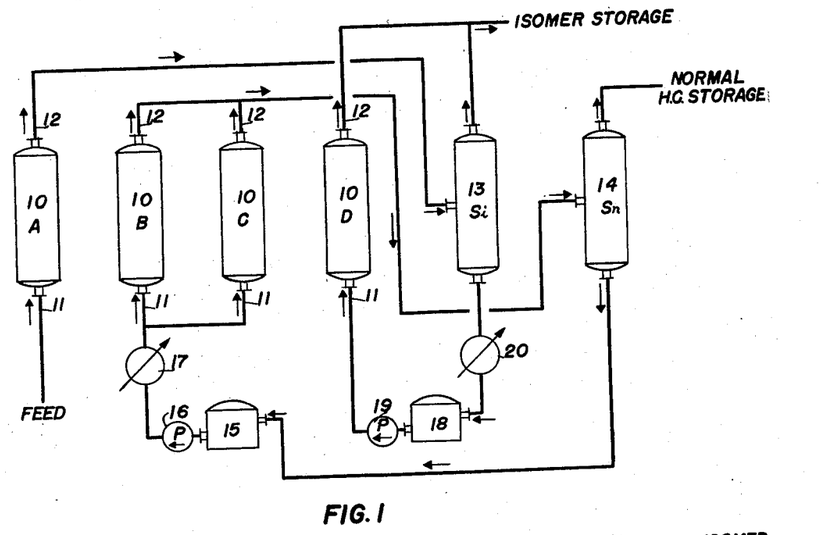
Figs. 1 to 4 are schematic flow diagrams illustrating the arrangement of process units employed in carrying out the process of this invention, and showing the stream flows while the process is being employed for the separation of the straight-chain paraffinic hydrocarbons in each stage of the process.

Because a plurality of operating phases are employed in carrying out the process of this invention, each tower is utilized successively in adsorbing, displacing, desorbing and cooling service. To facilitate an understanding of this invention, the flow through the system during each of these phases is illustrated by Figures 1–4. Each figure represents the flow arrangement at the selected times in the time cycle shown in Table I. In Figure 1 the stream flows are arranged in such a manner as to permit tower 10A to be employed in adsorbing service. When the raw feed is switched into this tower, the tower is full of a cooling oil in contact with the "molecular sieve" adsorbent particles, the oil having been used to reduce the elevated temperature resulting from the regeneration step. The initial effluent which is taken from tower 10A during this phase of the cycle is hot and is a small overlap fraction containing minor amounts of paraffinic hydrocarbons. This overlap fraction is sent to paraffinic stripping tower 14 for recovery of the straight-chain paraffinic hydrocarbons. At this point, the flow arrangement is changed to permit the processing of the next portion of the effluent from tower 10A. This effluent consists essentially of the cooling oil which has been heated to an elevated temperature by direct heat exchange with the adsorbent. The heated oil is sent to stripping tower 13 so that the heat can be utilized in this tower. In tower 13, the branched-chain hydrocarbons contained in flush oil streams from other vessels are stripped from this admixture and sent to storage. With the heat interface approaching the top of tower 10A, there is a small overlap consisting of an admixture of heated cooling oil and small amounts of isomers. This stream is also processed in stripping tower 13 for recovery of the branched-chain hydrocarbons. The flow arrangement for processing the effluent from tower 10A is then changed to permit the pure isomers which are recovered to be sent directly to storage. The feed is continuously introduced into tower 10A until the "molecular sieve" zeolite adsorbent becomes saturated with the normal or straight-chain paraffinic hydrocarbons. Tower 10A is then flushed with cold oil transferred from cold oil storage 18 (see Figure 2). The effluent from tower 10A which is initially recovered during the cold flushing steps consists essentially of the branched-chain hydrocarbons which were retained interstitially in the tower. These isomers are sent directly to storage. As the interface between the branched-chain hydrocarbons and the cold flushing oil approaches the top of the tower, an admixture between these respective streams develops, resulting in an impure overlap fraction. This overlap fraction is sent to isomer stripping tower 13 during the crossover period in order to recover the residual branched-chain hydrocarbons. When the effluent from tower 10A consists essentially of cold oil, the flow arrangement is modified to provide for the transfer of the cold flushing oil to isomer stripping tower 13 via tower 10C, which has just been treated in an adsorption phase of the cycle by passing a hot flush oil through the tower to heat the "molecular sieve" zeolite adsorbent to an elevated temperature. After the unadsorbed constituents of the feed stock have been flushed from tower 10A with the cold flushing oil, the regeneration phase of the processing cycle is initiated.

To effect this regeneration, hot oil from hot oil storage 15 is passed through the tower. The initial effluent recovered from tower 10A during the regeneration phase consists of the cold flushing oil remaining in the tower after the flushing step. This cold oil is transferred to isomer still 13 via hot adsorber 10C. As the interface between the cold flush oil and the hot regeneration oil approaches the top of the tower, the effluent consists of an overlap fraction containing small amounts of normal paraffinic hydrocarbons which have been stripped from the "molecular sieve" zeolite adsorbent. The flow is arranged so that the overlap fraction is transferred to the straight-chain paraffinic hydrocarbon stripping still, 14 (see Figure 3). The effluent next recovered from tower 10A consists of the hot regenerating oil containing the straight-chain paraffinic hydrocarbons which have been recovered from the "molecular sieve" zeolite adsorbent. This hot oil fraction is also processed in the straight-chain paraffinic hydrocarbon stripping still, 14. After substantially all of the straight-chain paraffinic hydrocarbons have been recovered from the adsorbent, the adsorbent is cooled with cold oil transferred from cool oil storage 18. This oil is essentially the flushing oil which was employed in flushing the unadsorbed branched-chain paraffinic hydrocarbons from 10C tower which was just employed in desorbing service. The initial effluent recovered from tower 10A during the cooling phase of the cycle consists of the hot oils containing the desorbed straight-chain paraffinic hydrocarbon. Flow is arranged so that this hot oil is continued to be sent to the straight-chain paraffinic hydrocarbon stripping still, 14. When substantially all of the hot oil is displaced from tower 10A, the tower is in condition for use in desorbing service. It can be seen that by directing the cold oil effluent during the flushing and desorbing steps through the hot, freshly-stripped adsorber, appreciable heat saving is realized. As a result, the only heat not directly recovered is that contained in the overhead streams from stripping towers 13 and 14, and in the bottoms from stripping tower 13, all of which are cooled and condensed by heat exchange with cooling waters. This heat duty is very light however.

In a specific embodiment of my invention four adsorption towers, 10 ft. high and 21″ in diameter, are employed. In each tower 1000 lbs. of "molecular sieve" zeolite adsorbent having a pore diameter of 5A. are contained in the tower. These adsorbents are calcium alumino-silicates that have been heated to remove the water of hydration. One-eighth-inch diameter pellets obtained from the Linde Air Products Co. are employed

TABLE I

Adsorption of n-paraffins on synthetic zeolite

TIME CYCLE ON ADSORPTION TOWERS

C/O = Crossover

Figure 2:
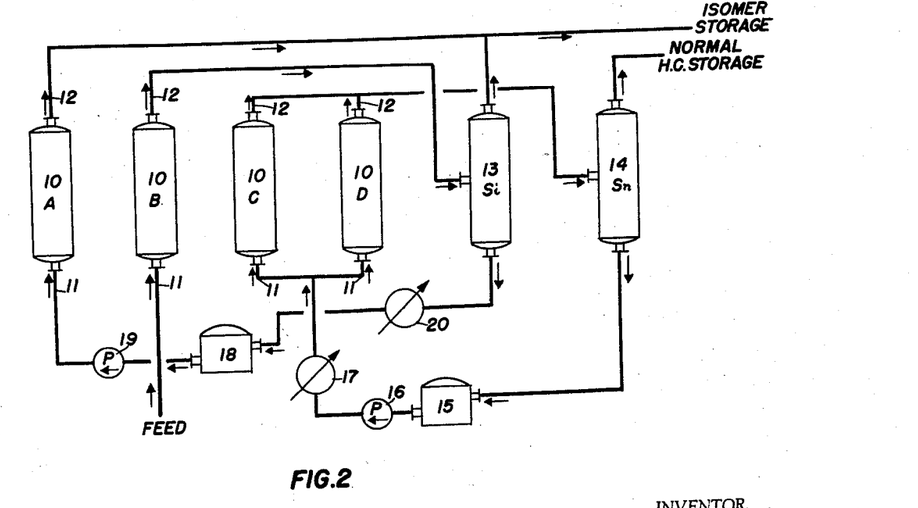
Figure 3:
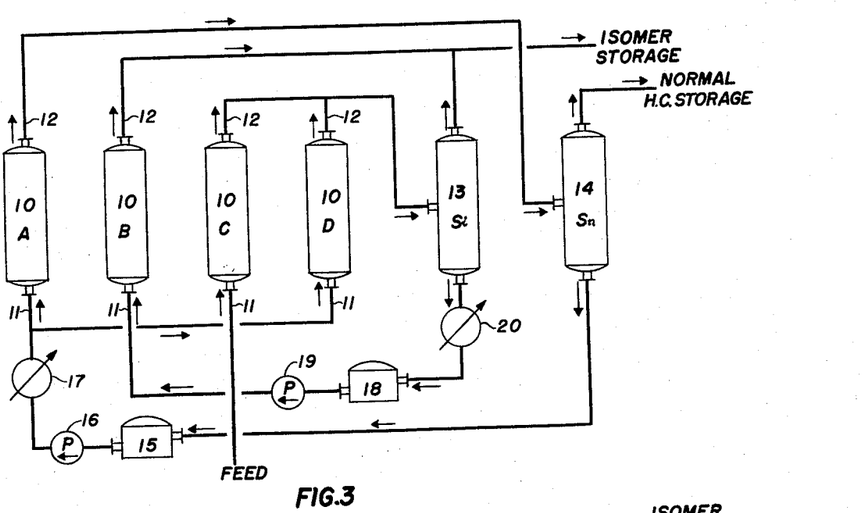
Figure 4:
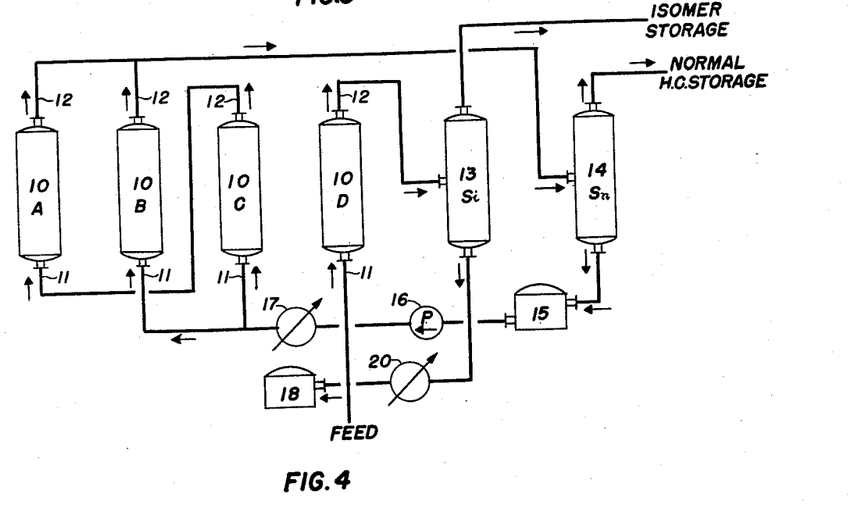

| Tower | Flow | Parameter | Fig. 1 | Fig. 2 | Fig. 3 | Fig. 4 |
|---|---|---|---|---|---|---|
| "A" Tower | In | Minutes | 100 | 60 | 140 | 50 |
| | | Material | Feed (20% normal, 80% isomer) | Cold flush | Hot oil flush / Hot flush oil + Normal paraffin | Cooling flush |
| | | Quantity | 100 gallons | 60 | 50 / 68 | 50 |
| | | Rate | 1.0 g.p.m. | 1.0 | 0.357 / 0.468 | 1.0 |
| | | From | Storage | Cold oil storage | Hot oil storage | "C" Tower |
| | Out | Material | Flush oil / C/O / Isomers / C/O | Isomer / C/O | Hot flush oil + Normal paraffin / C/O | Flush oil / C/O |
| | | Quantity | 35 / 10 / 25 / 5 | 45 / 10 | 68 / 10 | 50 / 10 |
| | | Rate | — / 0.8 / — / — | — / — | 0.468 / — | 1.0 / — |
| | | To | $S_r$ / $S_r$ / Isomer storage / $S_r$ | Isomer storage / $S_N$ | $S_N$ / $S_N$ | "C" Tower / $S_N$ |
| | | Minutes | 44 / 12.5 / 31 / 5 | 45 / 10 | 140 / 10 | 62.5 / 10 |
| "B" Tower | In | Minutes | 50 | 100 | 60 | 140 |
| | | Material | Cooling flush | Feed (20% normal + 80% isomer) | Cold flush | Hot oil flush |
| | | Quantity | 50 | 100 | 60 | 50 |
| | | Rate | 1.0 | 1.0 | 1.0 | 0.357 |
| | | From | "D" Tower | Storage | Cold oil storage | Hot oil storage |
| | Out | Material | Flush oil / C/O | Flush oil / C/O / Isomers / C/O | Isomers / C/O | Hot flush oil + Normal paraffin / C/O |
| | | Quantity | 50 / 10 | 35 / 5 / 25 / 5 | 45 / 10 | 68 / 10 |
| | | Rate | 1.0 / — | — / — / — / 0.8 | — / — | 0.468 / — |
| | | To | "D" Tower / $S_N$ | $S_r$ / $S_r$ / Isomer storage / $S_r$ | Isomer storage / $S_N$ | $S_N$ / $S_N$ |
| | | Minutes | 62.5 / 10 | 44 / 5 / 31 / 12.5 | 45 / 10 | 140 / 10 |
| "C" Tower | In | Minutes | 140 | 50 | 100 | 60 |
| | | Material | Hot oil flush / Hot flush oil + Normal paraffin | Cooling flush | Feed (20% normal + 80% isomer) | Cold flush |
| | | Quantity | 50 / 68 | 50 | 100 | 60 |
| | | Rate | 0.357 / 0.468 | 1.0 | 1.0 | 1.0 |
| | | From | Hot oil storage | "A" Tower | Storage | Cold oil storage |
| | Out | Material | Hot flush oil + Normal paraffin / C/O | Flush oil / C/O | Flush oil / C/O / Isomers / C/O | Isomers / C/O |
| | | Quantity | 68 / 10 | 50 / 5 | 35 / 5 / 25 / 10 | 45 / 10 |
| | | Rate | 0.468 / — | 1.0 / 1.0 | — / — / — / 0.8 | — / — |
| | | To | $S_N$ / $S_N$ | "A" Tower / $S_r$ | $S_r$ / $S_r$ / Isomer storage / $S_r$ | Isomer storage / $S_N$ |
| | | Minutes | 140 / 10 | 62.5 / 5 | 44 / 5 / 31 / 12.5 | 45 / 10 |
| "D" Tower | In | Minutes | 60 | 140 | 50 | 100 |
| | | Material | Cold flush | Hot oil flush / Hot flush oil + Normal paraffin | Cooling flush | Feed (20% normal + 80% isomer) |
| | | Quantity | 60 | 50 / 68 | 50 | 100 |
| | | Rate | 1.0 | 0.357 / 0.468 | 1.0 | 1.0 |
| | | From | Cold oil storage | Hot oil storage | "B" Tower | Storage |
| | Out | Material | Isomer / C/O | Hot flush oil + Normal paraffin / C/O | Flush oil / C/O | Flush oil / C/O / Isomer / C/O |
| | | Quantity | 45 / 10 | 68 / 10 | 50 / 5 | 35 / 5 / 25 / 10 |
| | | Rate | — / — | 0.468 / — | 1.0 / 1.0 | — / — / — / 0.8 |
| | | To | Isomer storage / $S_N$ | $S_N$ / $S_N$ | "B" Tower / $S_r$ | $S_r$ / $S_r$ / Isomer storage / $S_r$ |
| | | Minutes | 45 / 10 | 140 / 10 | 62.5 / 5 | 44 / 5 / 31 / 12.5 | to process 100 gallons of feed stock having the following composition:

| Component: | Vol. percent |
|---|---|
| n–C$_5$ | 7.4 |
| i–C$_5$ | 3.6 |
| n–C$_6$ | 8.0 |
| i–C$_6$'s | 50.5 |
| n–C$_7$ | 4.6 |
| i–C$_7$'s | 25.9 |
| | 100.0 |

At 1.0 g.p.m., a total cycle time of 400 minutes is required, 100 minutes being employed as the adsorbing period of each adsorber. The temperature of adsorption is 100° F. The cold displacing oil is supplied in an amount of 60 gallons at a rate of 1.0 gallon per minute at a temperature of 100° F. One hundred gallons of desorbing liquid at a temperature of 600° F. is employed. The first 50 gallons of displacing fluid is passed through the adsorption tower at the rate of 1.0 g.p.m. The remaining amount of hot flush oil is passed through at the rate of 0.357 g.p.m. The cooling oil is supplied at a temperature of 100° F., and 50 gallons of this oil are passed through the adsorption tower at the rate of 0.35 g.p.m. The isomer still is a conventional fractional distillation tower having 10 theoretical stages and employing an 8:1 reflux ratio. At a feed rate of 0.15 g.p.m., 0.1 g.p.m. of branched-chain hydrocarbons are obtained as overhead from this unit. The straight-chain paraffinic hydrocarbon still is a similar unit, also having 10 theoretical stages and using an 8:1 reflux ratio. Straight-chain paraffinic hydrocarbons at the rate of 0.2 g.p.m. are obtained as tower overhead using a feed rate of 1.4 g.p.m. The total branched-chain paraffin hydrocarbon product of 80 gallons is obtained at a rate of 0.8 g.p.m. The remaining straight-chain paraffinic hydrocarbon constituents are recovered at the rate of 0.2 g.p.m.

By referring to Table I, there will be seen the time cycle for the entire 400-minute operation. In this table the sequence of operations through which each tower operates during the course of one cycle is readily seen. The input and output to each column during the 400-minute cycle is set forth and the subsequent distribution of the tower effluent is provided. In this table is also seen the manipulative technique of passing the cold oil effluent obtained during the flushing of the tower, after being in adsorbing service, as well as the preliminary effluent passing from the adsorption tower during the regeneration step.

In the process of this invention, normally gaseous or liquid feed stocks containing admixtures of straight-chain paraffinic hydrocarbons and branched-chain paraffinic hydrocarbons are employed. Such feed stocks are obtained as straight-run, petroleum distillate products, or as reaction effluent from the isomerization of C$_4$–C$_7$ saturated aliphatic feed stocks or the low-boiling fraction of C$_8$ and lighter catalytic reformate. While the process of this invention is especially adaptable in the treating of petroleum-derived feed-stocks of this nature to separate normal paraffinic hydrocarbons from branched-chain paraffinic hydrocarbons, it is to be understood that other feed stocks containing substantial amounts of these paraffinic hydrocarbons can be used.

Natural or synthetic crystalline zeolites having rigid, three-dimensional, anionic networks are suitable for carrying out the process of this invention. The pore dimensions of the crystalline zeolite must be sufficient for the zeolite to selectively adsorb straight-chain hydrocarbons but sufficiently small to exclude the branched-chain and/or cyclic hydrocarbons. This requires that the zeolites be highly porous and have pores of molecular magnitude, ranging between about 15 to 20 billionths of an inch in diameter. It is also important that the interstitial pores be of uniform size. For use in the recovery of branched-chain paraffinic hydrocarbons from admixture with straight-chain paraffinic hydrocarbons, the crystalline zeolite preferably has a pore diameter of about five Angstroms. A suitable zeolite of this type is a 5 A. calcium alumino silicate marketed by Linde Air Products Co. It is, therefore, apparent that the selection of the crystalline zeolite is to be made on the basis of the molecular diameters of the hydrocarbons in the system which is being processed. The pore diameter of the selective adsorbent must be small enough to permit only the materials which are to be adsorbed to enter into the pore system. Suitable alkali and/or alkaline earth metal zeolites for use in this invention are exemplified by the crystalline zeolites described by Barrer in U.S. Patent 2,306,610, as well as those artificial zeolites which are commercially available from the Linde Air Products Company.

The adsorption step of the instant invention can be carried out at a temperature within the range of about 60° F. to about 300° F. and at pressures ranging from subatmospheric to superatmospheric. It is preferred, however, that a temperature within the range of about 100° F. to 140° F. and a pressure of about 10–25 p.s.i.g. be employed. Similarly, the purging step in which the unabsorbed constituents of the feed stock are removed from the adsorption tower carried out subsequent to the desorption step can be carried out at a temperature of about 60° F. to 300° F. employing subatmospheric or superatmospheric pressures. It is preferred, however, that a temperature within the range of about 100° F. to 140° F., and a pressure of about 15–25 p.s.i.g. be employed. The regeneration of the zeolite after use in adsorbing straight-chain paraffin hydrocarbons from the feed stock is carried out at a temperature between about 600° and 700° F. Because "molecular sieves" are susceptible to deactivation upon being heated to temperatures in excess of about 1100° F., it is preferred that the regeneration be carried out at a temperature between about 650° and 700° F.

In the process of this invention the heat of desorption is supplied by the hot desorbing oil, which serves the multiple purpose of heating the adsorbent as well as displacing a portion of the adsorbed straight-chain paraffin hydrocarbon. In order to enhance the efficiency of desorption, auxiliary heating devices may be installed in the adsorption column. In one expedient an imbedded heating coil through which steam or other heat-exchange fluids can be circulated is provided. It is preferred, however, if such an expedient is employed, to utilize a solid heat-transfer medium which is admixed with and disposed in the adsorption tower in intimate admixture with the zeolite adsorbent. This particular expedient is especially desirable when employing a supplementary vacuum application to further enhance the effectiveness of desorption with the hot regeneration fluid, employing a flow scheme illustrated in Figures 5 to 8. The granular, refractory aggregate employed as the heat-transfer means preferably is prepared from alumina; however, other prior art refractory materials such as quartz, silica, sandstone, dolomite and magnesium oxide can be used. In general, aggregates having diameters of about ⅛–¼ inch have satisfactory thermal conductivity. The amount of granular heat-transfer means which is admixed with the zeolite adsorbent will depend upon the size of the tower. In general, however, about 1 to 15 parts by volume of zeolite adsorbent per part, by volume, of granular heat-transfer means should be used.

Referring to Figures 5–8 which separately illustrate the interrelated phases of the adsorption, flushing, regeneration, and cooling steps of the cycle, gaseous charge, comprising a mixture of normal and isomeric paraffins, enters through line 30 and passes through adsorber 31A which is maintained at an elevated temperature to retain the non-adsorbable components in the gas phase. Unadsorbed isomeric paraffins are withdrawn from the bottom of the tower, through line 32, and transferred to storage or other use after being condensed and cooled.

Meanwhile, flush oil (which, for example, can be heavy alkylate) is withdrawn from storage tank 33 through line 34, heat-exchanger 35, line 36, pump 37, and line 38 to tower 31C which is hot from a previous desorption period. The partially heated flush-oil, upon passing through the bed of "molecular sieve" and pebbles in tower 31C, cools the bed and becomes heated, after which it is withdrawn through line 39, pump 40, and line 41 to furnace 42. In furnace 42, the flush-oil is heated to a temperature sufficient to cause desorption in tower 31B, but not to a temperature at which it or the adsorbed materials will decompose. A temperature of about 575–625° F. usually meets these requirements. The hot flush-oil then flows through line 43 to tower 31B wherein it heats the adsorbent and heat-exchange pebbles. Part of the adsorbed normal paraffins are desorbed by this hot oil and withdrawn with it through line 44 to stripper 45 which may be operated at a reduced pressure to further improve the thermal efficiency of the process.

At the same time, a vacuum is drawn on tower 31D by means of vacuum pump or ejector 46, and desorbed normal paraffins are withdrawn through line 47 to condenser-separator 48, in which only the heavier hydrocarbons are condensed. The uncondensed materials pass through the vacuum pump to a final condenser and are withdrawn as product. Condensed heavier paraffins and desorbent are transferred through line 49 and barometric leg 50 to join line 44 and flow to stripper 45. In stripper 45, normal paraffins are separated from the flush-oil and pass overhead through line 51 to condenser 52. From condenser 52, the liquified normal paraffins pass through line 53 to branch lines 54 and 55, through which flow product (to storage) and stripper reflux. Stripped flush-oil is withdrawn from stripper 45 via line 56 to reboiler 57, from which a portion of the material is returned to stripper 45 and the remainder is transferred through line 58 to heat-exchanger 35 and thence through line 59 to storage tank 33.

While this process has been illustrated by reference to adsorption from a gas phase, it may also be applied to liquid phase adsorption. In this case, provision must be made for flushing the interstitial isomeric paraffins from the beds of adsorbent after the adsorption step, and an isomer recovery tower must be provided. Such an arrangement is analogous to that shown in Figure 1.

As a specific example of this phase of the invention, 1000 lbs. of pelleted chabazite having a pore diameter of 5 Angstroms, and an equal volume of fused alumina (2910 pounds) are contained in each of the four adsorption towers shown in Figures 5 to 8. Five hundred pounds of a feed stock having the above-mentioned composition consisting of 80% by volume of branched-chain paraffin hydrocarbons and 20 volume percent of straight-chain paraffinic hydrocarbons is charged to tower 31A (Figure 5) for a 30-minute adsorption period. The normal compounds are adsorbed while the isomeric compounds pass through the tower and are recovered in the subsequent processing phases of the invention. At the end of the 30-minute adsorption period, feed is switched to tower 31C (Figure 6) and the straight-chain paraffinic hydrocarbons are desorbed from the zeolite adsorbent in tower 31A by initially passing 1000 lbs. of heavy alkylate at 610° F. through the beds, and then applying a vacuum (Figure 7) of 0.1 cm. Hg, absolute, to the bed. The effluent streams from the tower are separated into 100 lbs. of purified straight-chain paraffinic hydrocarbons and 1000 pounds of flush oil. By employing the granular, heat-transfer means as supplementary cooling expedients, the temperature of the bed decreases only 9° F. during the vacuum desorption step, whereas a temperature decrease of 30° F. would have resulted had the alumina pellets not been used.

TABLE II

*Time cycle for gas adsorption*

PROCESS USING SYNTHETIC CHABAZITE AND HEAT-TRANSFER PEBBLES

Scale: 1 space = 1 minute

Figure 5:
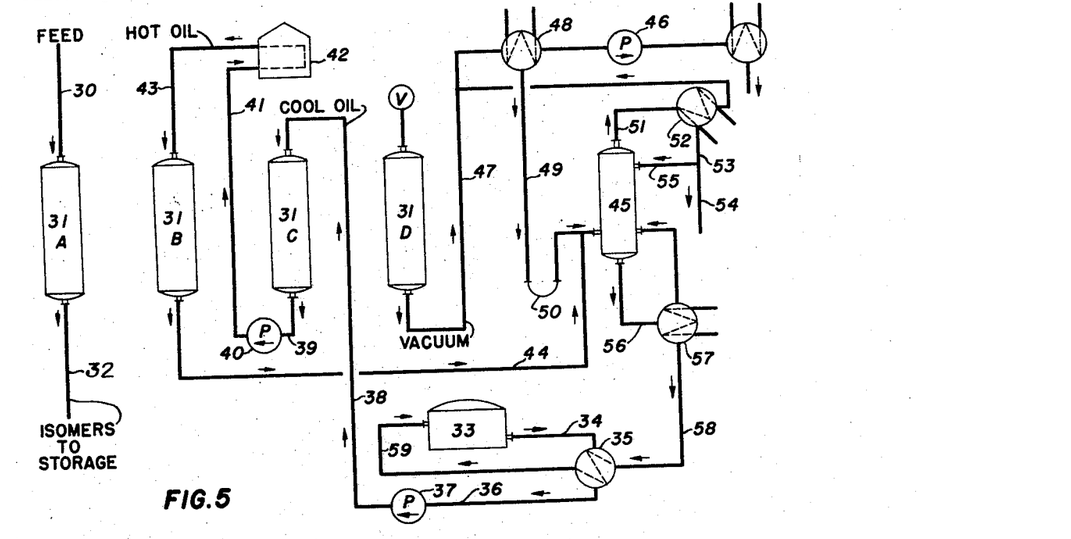
Figures 5 to 8 illustrate schematically flow diagrams employed in conjunction with the use of an evacuation step in the desorption phase of the operation cycle.
Figure 6:
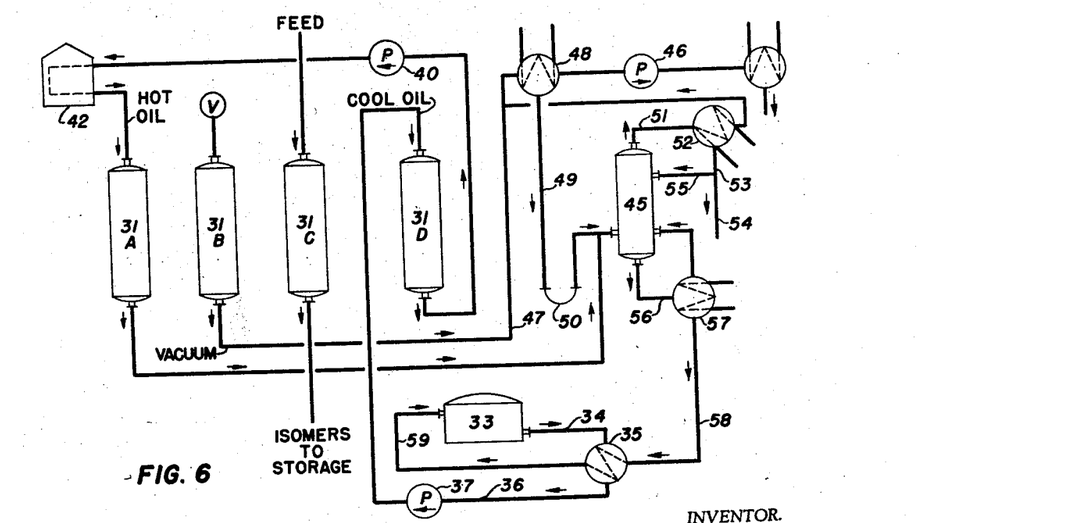
Figure 7:
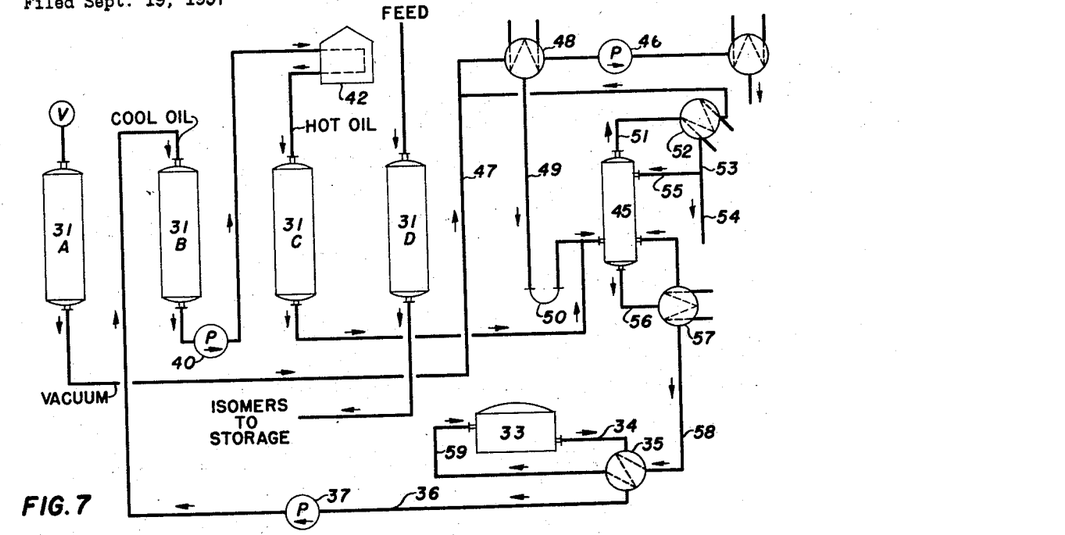
Figure 8:
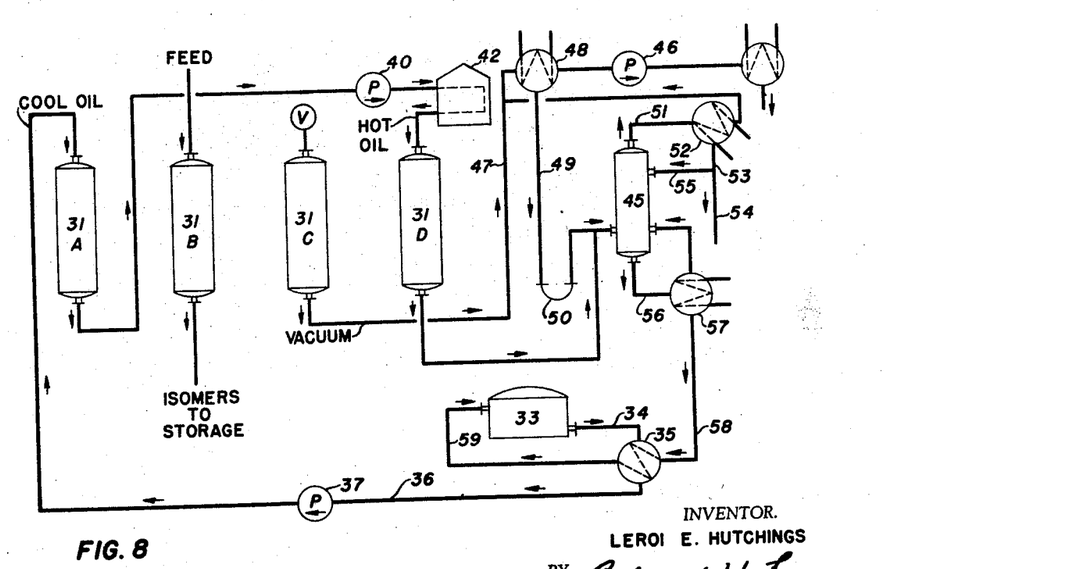

| | | Fig. 5 | | | Fig. 6 | | Fig. 7 | | Fig. 8 | |
|---|---|---|---|---|---|---|---|---|---|---|
| Tower A | In | Charge (gas) 500# | | | Hot oil from "D" 1000# | Pump and drain | Vacuum | Shut in | Cool oil 1100# | Drain |
| | Out | Isomers to storage 400# | | | To stripper 970# | | To vacuum system 130# | | Heated oil to "D" 1000# | 100# |

Recycle to storage

| | | | | | | | | | | |
|---|---|---|---|---|---|---|---|---|---|---|
| Tower B | In | Shut in | Hot oil from "C" 1000# | Pump and drain | Vacuum | Shut in | Cool oil 1100# | Drain | Charge (gas) 500# | |
| | Out | | To stripper 970# | | To vacuum system 130# | | Heated oil to "C" 1000# | Recycle 100# | Isomers to storage 400# | |

| | | | | | | | | | | |
|---|---|---|---|---|---|---|---|---|---|---|
| Tower C | In | Shut in | Cool oil | Drain | Charge gas | | Hot oil | Pump and drain | Vacuum | Shut in |
| | Out | | Heated oil to "B" | Recycle | Isomers to storage | | To stripper | | To vacuum still | |

| | | | | | | | | | | |
|---|---|---|---|---|---|---|---|---|---|---|
| Tower D | In | Vacuum | Shut in | Cool oil | | Drain | Charge (gas) | Shut in | Hot oil | Pump and drain |
| | Out | To vacuum system | | Heated oil to "A" | | Recycle | Isomers to storage | | To stripper | |

In Table II is graphically shown the schematic cycle representation. As low an absolute pressure as can be conveniently and economically obtained should be employed during the vacuum desorption phase of the regeneration. With conventional vacuum-producing equipment, a pressure of not greater than about 1 p.s.i.a. can be obtained and should be used in order to obtain a desired efficiency. The cooling step (Figure 8) which is carried out as the final phase of the processing cycle utilizes a cooling oil at a temperature of about 60° to 300° F. in order to bring the desorption bed down to the desired operating temperature. Although four towers are shown in the illustrative embodiment to achieve continuity of operations, other tower arrangements with more or fewer beds and corresponding modifications in the flow can be used.

Because of the interrelation between the purging, regeneration, and cooling steps or phases of the processing cycle, the heat-transfer fluid which is used in each of these steps is the same material. When processing feed stocks for use in an isomerization process, or in the processing of isomerization effluent to recover high-octane-number blending stocks, it is preferred to use a high-octane-number, gasoline component such as heavy alkylate as the heat-transfer liquid to avoid deleteriously affecting the blending value of the isomer product. Heavy alkylate is that portion of the alkylation effluent boiling between about 340° and 450° F. produced in the processing of refinery butanes and butenes in a catalytic alkylation process employing sulfuric acid or hydrofluoric acid as the catalyst. Alkylation is a conventional petroleum refining unit process which is widely employed in modern petroleum refining. Because a discussion of this particular process is outside the scope of this invention, reference is made to "Progress in Petroleum Technology Advances in Chemistry Series, #5, ACS 1951." Depending upon the hydrocarbon system which is being processed in the adsorption operation of this invention, various heat-transfer fluids can be used. In general, a satisfactory heat-transfer liquid employed in this service is a high-boiling hydrocarbon having an initial boiling point higher than the endpoint of the highest boiling hydrocarbon in the charge and substantially free from aromatics, olefins or normal paraffins, or sulfur or other polar type compounds.

Suitable heat-transfer liquids which can be used include but are not limited to various hydrocarbon oils, the selection of which, as noted from Table III, will preferably be related to the composition of the charge stock.

TABLE III

| Charge | Heat-Transfer Liquid |
| --- | --- |
| n-$C_5$-i-$C_5$ | iso-octanes or below. |
| n-$C_6$-i-$C_6$ | iso-nonanes or below. |
| n-$C_7$-i-$C_7$ | iso-decanes or below. |
| n-$C_8$-i-$C_8$ | iso-undecanes or below. |

Although the foregoing invention has been specifically described, it is apparent that a number of modifications within the scope of this invention will be obvious to those skilled in the art to which this invention pertains. It is intended, therefore, that the instant invention be limited only in the manner specifically set forth in the appended claim structure.

I claim as my invention:

1. A process for selectively fractionating straight-chain paraffinic hydrocarbons from admixture with branched chain paraffinic hydrocarbons which comprises (1) contacting an admixture consisting essentially of branched-chain paraffinic hydrocarbons and straight-chain paraffinic hydrocarbons in a first adsorption zone with zeolite, adsorbent particles under conditions of temperature and pressure conducive to selectively adsorbing said straight-chain hydrocarbons until said particles are saturated with the straight-chain hydrocarbons; (2) flushing the unadsorbed constituents of said admixture from said first zone with a cool, liquid, hydrocarbon, flushing oil having an initial boiling point not less than the end boiling point of the highest boiling hydrocarbon in said admixture and being substantially non-adsorbable by said zeolite particles; (3) recovering the branched-chain hydrocarbons from admixture with said flushing oil; (4) passing cool, flushing oil to a second adsorption zone containing zeolite, adsorbent particles which have been freshly regenerated and are at an elevated temperature resulting from the regeneration whereby said cool oil is heated to an elevated temperature by direct heat exchange with said regenerated zeolite particles for subsequent use as a heat-source oil; (5) regenerating the zeolite adsorbent in said first zone to remove the adsorbed straight-chain hydrocarbon constituents of said admixture by contacting said adsorbent with said heat-source oil at an elevated temperature; and (6) thereafter cooling said regenerated zeolite adsorbent particles in said first zone by contacting said zeolite particles with a cooling oil, said flushing oil, heat-source oil and cooling oil having substantially the same composition.

2. A process for selectively fractionating straight-chain paraffinic hydrocarbons from admixture with branched-chain paraffinic hydrocarbons which comprises (1) contacting an admixture consisting essentially of branched-chain paraffinic hydrocarbons and straight-chain paraffinic hydrocarbons in a first adsorption zone with zeolite, adsorbent particles, at a temperature within the range of about 100° to 140° F., capable of selectively adsorbing said straight-chain hydrocarbons until said particles are saturated with the straight-chain hydrocarbons; (2) flushing the unadsorbed constituents of said admixture from said first zone with a cool, liquid, hydrocarbon, flushing oil at a temperature within the range of about 100° to 140° F. and having an initial boiling point not less than the end boiling point of a highest boiling hydrocarbon in said admixture and being substantially non-adsorbable by said zeolite particles; (3) recovering the branched-chain hydrocarbons from admixture with said flushing oil; (4) passing cool, flushing oil to a second adsorption zone containing zeolite adsorbent particles which have been freshly regenerated and are at an elevated temperature within the range of about 600° to 700° F. resulting from the regeneration whereby said cool oil is heated to an elevated temperature within the range of about 600° to 700° F. by direct heat exchange with said regenerated zeolite particles for subsequent use as a heat-source oil; (5) regenerating the zeolite adsorbent in said first zone to remove the adsorbed straight-chain hydrocarbon constituents of said admixture by contacting said adsorbent with said heat-source oil at an elevated temperature within the range of about 600° to 700° F.; and (6) thereafter cooling said regenerated zeolite adsorbent particles in said first zone to a temperature within the range of about 100° to 140° F. by contacting said zeolite particles with a cooling oil, said flushing oil, heat-source oil and cooling oil having substantially the same composition.

3. A process for selectively fractionating straight-chain paraffinic hydrocarbons from admixture with branched-chain paraffinic hydrocarbons which comprises (1) contacting an admixture consisting essentially of branched-chain paraffinic hydrocarbons and straight-chain paraffinic hydrocarbons in a first adsorption zone with zeolite, adsorbent particles, at a temperature within the range of about 100° to 140° F., capable of selectively adsorbing said straight-chain hydrocarbons until said particles are saturated with the straight-chain hydrocarbons; (2) flushing the unadsorbed constituents of said admixture from said first zone with a cool, liquid, hydrocarbon, flushing oil at a temperature within the range of about 100° to 140° F. and having an initial boiling point not less than the end boiling point of the highest boiling hydrocarbon in said admixture and being substantially non-adsorbable by said zeolite particles; (3) fractionally distilling the branched-chain hydrocarbons from admixture with said flushing oil; (4) passing cool, flushing oil to a second adsorption zone containing zeolite adsorbent particles which have been freshly regenerated and are at an elevated temperature within the range of about 600° to 700° F. resulting from the regeneration whereby said cool oil is heated to an elevated temperature within the range of about 600° to 700° F. by direct heat exchange with said regenerated zeolite particles for subsequent use as a heat-source oil; (5) regenerating the zeolite adsorbent in said first zone to remove the adsorbed straight-chain hydrocarbon constituents of said admixture by contacting said adsorbent with said heat-source oil at an elevated temperature within the range of about 600° to 700° F.; and (6) thereafter cooling said regenerated zeolite adsorbent particles in said first zone to a temperature within the range of about 100° to 140° F. by contacting said zeolite particles with a cooling oil, said flushing oil, heat-source oil and cooling oil having substantially the same composition.

4. A process for selectively fractionating straight-chain paraffinic hydrocarbons from admixture with branched-chain paraffinic hydrocarbons which comprises (1) contacting an admixture consisting essentially of branched-chain paraffinic hydrocarbons and straight-chain paraffinic hydrocarbons in a first adsorption zone with zeolite, adsorbent particles, at a temperature within the range of about 100° to 140° F., capable of selectively adsorbing said straight-chain hydrocarbons until said particles are saturated with the straight-chain hydrocarbons; (2) flushing the unadsorbed constituents of said admixture from said first zone with a cool, heavy alkylate, flushing oil at a temperature within the range of about 100° to 140° F. and having an initial boiling point not less than the end boiling point of the highest boiling hydrocarbon in said admixture and being substantially non-adsorbable by said zeolite particles; (3) fractionally distilling the branched-chain hydrocarbons from admixture with said flushing oil; (4) passing cool, flushing oil to a second adsorption zone containing zeolite adsorbent particles which have been freshly regenerated and are at an elevated temperature within the range of about 600° to 700° F. resulting from the regeneration whereby said cool oil is heated to an elevated temperature within the range of about 600° to 700° F. by direct heat exchange with said regenerated zeolite particles for subsequent use as a heat-source oil; (5) regenerating the zeolite adsorbent in said first zone to remove the adsorbed straight-chain hydrocarbon constituents of said admixture by contacting said adsorbent with said heat-source oil at an elevated temperature within the range of about 600° to 700° F.; and (6) thereafter cooling said regenerated zeolite adsorbent particles in said first zone to a temperature within the range of about 100° to 140° F. by contacting said zeolite particles with a cooling oil, said flushing oil, heat-source oil and cooling oil having substantially the same composition.

5. In an isomerization process which comprises contacting a feed stock consisting essentially of at least one isomerizable, saturated $C_5$–$C_8$ hydrocarbon at isomerizing conditions to produce a reaction effluent consisting essentially of an admixture of straight-chain and branched-chain paraffinic hydrocarbons, the improvement in a product recovery process for selectively removing the straight-chain hydrocarbons from admixture with branched-chain hydrocarbons which comprises (1) contacting an admixture consisting essentially of branched-chain paraffinic hydrocarbons and straight-chain paraffinic hydrocarbons in a first adsorption zone with zeolite, adsorbent particles, at a temperature within the range of about 100° to 140° F., capable of selectively adsorbing said straight-chain hydrocarbons until said particles are saturated with the straight-chain hydrocarbons; (2) flushing the unadsorbed constituents of said admixture from said first zone with a cool, heavy alkylate, flushing oil at a temperature within the range of about 100° to 140° F., and having an initial boiling point not less than the end boiling point of the highest boiling hydrocarbon in said admixture and being substantially non-adsorbable by said zeolite particles; (3) fractionally distilling the branched-chain hydrocarbons from admixture with said flushing oil; (4) passing cool, flushing oil to a second adsorption zone containing zeolite adsorbent particles which have been freshly regenerated and are at an elevated temperature within the range of about 600° to 700° F. resulting from the regeneration whereby said cool oil is heated to an elevated temperature within the range of about 600° to 700° F. by direct heat exchange with said regenerated zeolite particles for subsequent use as a heat-source oil; (5) regenerating the zeolite adsorbent in said first zone to remove the adsorbed straight-chain hydrocarbon constituents of said admixture by contacting said adsorbent with said heat-source oil at an elevated temperature within the range of about 600° to 700° F.; and (6) thereafter cooling said regenerated zeolite adsorbent particles in said first zone to a temperature within the range of about 100° to 140° F. by contacting said zeolite particles with a cooling oil, said flushing oil, heat source oil and cooling oil having substantially the same composition.

6. In a continuous cyclic process employing four adsorption beds for selectively adsorbing straight-chain, paraffinic hydrocarbons from admixture with branched-chain, paraffinic hydrocarbons while one bed is in adsorption service, the branched-chain hydrocarbons are being flushed from a second bed, the third bed is being regenerated, and the fourth bed is being cooled in preparation for re-use in the adsorption service, the steps which comprise (1) contacting an admixture consisting essentially of branched-chain paraffinic hydrocarbons and straight-chain paraffinic hydrocarbons in a first adsorption zone with zeolite, adsorbent particles at a temperature within the range of about 100° to 140° F. and capable of selectively adsorbing said straight-chain hydrocarbons until said particles are saturated with the straight-chain hydrocarbons; (2) flushing the unadsorbed constituents of said admixture from said first zone with a cool, heavy alkylate, flushing oil, at a temperature within the range of about 100° to 140° F., having an initial boiling point not less than the end boiling point of the highest boiling hydrocarbon in said admixture and being substantially non-adsorbable by said zeolite particles; (3) fractionally distilling the branched-chain hydrocarbons from admixture with said flushing oil; (4) passing cool, flushing oil to a second adsorption zone containing zeolite adsorbent particles which have been freshly regenerated and are at an elevated temperature within the range of about 600° to 700° F. resulting from the regeneration whereby said cool oil is heated to an elevated temperature within the range of about 600° to 700° F. by direct heat exchange with said regenerated zeolite particles for subsequent use as a heat-source oil; (5) regenerating the zeolite adsorbent in said first zone to remove the adsorbed straight-chain hydrocarbon constituents of said admixture by contacting said adsorbent with said heat-source oil at an elevated temperature within the range of about 600° to 700° F.; and (6) thereafter cooling said regenerated zeolite adsorbent particles in said first zone to a temperature within the range of about 100° to 140° F. by contacting said zeolite particles with a cooling oil, said flushing oil, heat-source oil and cooling oil having substantially the same composition.

7. A process for selectively fractionating straight-chain paraffinic hydrocarbons from admixture with branched-chain paraffinic hydrocarbons which comprises (1) contacting an admixture consisting essentially of branched-chain paraffinic hydrocarbons and straight-chain paraffinic hydrocarbons in a first adsorption zone with zeolite, adsorbent particles capable of selectively adsorbing said straight-chain hydrocarbons until said particles are saturated with the straight-chain hydrocarbons, said particles having admixed therewith a plurality of granular, refractory, heat-transfer particles; (2) flushing the unadsorbed constituents of said admixture from said first zone with a cool, liquid, hydrocarbon, flushing oil having an initial boiling point not less than the end boiling point of the highest boiling hydrocarbon in said admixture and being substantially non-adsorbable by said zeolite particles; (3) recovering the branched-chain hydrocarbons from admixture with said flushing oil; (4) passing cool, flushing oil to a second adsorption zone containing zeolite adsorbent particles which have been freshly regenerated and are at an elevated temperature resulting from the regeneration whereby said cool oil is heated to an elevated temperature by direct heat exchange with said regenerated zeolite particles for subsequent use as a heat-source oil; (5) regenerating the zeolite adsorbent in said first zone to partially remove the adsorbed straight-chain hydrocarbon constituents of said admixture by contacting the admixture of heat-transfer particles and said adsorbent with said heat-source oil at an elevated temperature and subsequently depressurizing the adsorption zone containing said admixture to a subatmospheric pressure; and (6) thereafter cooling said regenerated zeolite adsorbent particles in said first zone by contacting said zeolite particles with a cooling oil, said flushing oil, heat-source oil and cooling oil having substantially the same composition.

8. A process for selectively fractionating straight-chain paraffinic hydrocarbons from admixture with branched-chain paraffinic hydrocarbons which comprises (1) contacting an admixture consisting essentially of branched-chain paraffinic hydrocarbons and straight-chain paraffinic hydrocarbons in a first adsorption zone with zeolite, adsorbent particles, at a temperature within the range of about 100° to 140° F., capable of selectively adsorbing said straight-chain hydrocarbons until said particles are saturated with the straight-chain hydrocarbons, said particles having admixed therewith a plurality of granular, refractory, heat-transfer particles; (2) flushing the unadsorbed constituents of said admixture from said first zone with a cool, liquid, hydrocarbon, flushing oil at a temperature within the range of about 100° to 140° F. and having an initial boiling point less than the end boiling point of the highest boiling hydrocarbon in said admixture and being substantially non-adsorbable by said zeolite particles; (3) recovering the branched-chain hydrocarbons from admixture with said flushing oil; (4) passing cool, flushing oil to a second adsorption zone containing zeolite adsorbent particles which have been freshly regenerated and are at an elevated temperature within the range of about 550° to 650° F. resulting from the regeneration whereby said cool oil is heated to an elevated temperature within the range of about 550° to 650° F. by direct heat exchange with said regenerated zeolite particles for subsequent use as a heat-source oil; (5) regenerating the zeolite adsorbent in said first zone to partially remove the adsorbed straight-chain hydrocarbon constituents of said admixture by contacting the admixture of heat-transfer particles and said adsorbent with said heat-source oil at an elevated temperature within the range of about 550° to 650° F. and subsequently depressurizing the adsorption zone containing said admixture to a subatmospheric pressure; and (6) thereafter cooling said regenerated zeolite adsorbent particles in said first zone to a temperature within the range of about 100° to 140° F. by contacting said zeolite particles with a cooling oil, said flushing oil, heat-source oil and cooling oil having substantially the same composition.

9. A process in accordance with claim 8 in which said heat-transfer particles are present in the ratio of 1 to 25 parts by volume to 1 part of zeolite adsorbent particles.

10. In a continuous cyclic process employing four adsorption beds for selectively adsorbing straight-chain, paraffinic hydrocarbons from admixture with branched-chain, paraffinic hydrocarbons while one bed is in adsorption service, the branched-chain hydrocarbons are being flushed from a second bed, the third bed is being regenerated, and the fourth bed is being cooled in preparation for re-use in the adsorption service, the steps which comprise (1) contacting an admixture consisting essentially of branched-chain paraffinic hydrocarbons and straight-chain paraffinic hydrocarbons in a first adsorption zone with zeolite, adsorbent particles, at a temperature within the range of about 100° to 140° F., capable of selectively adsorbing said straight-chain hydrocarbons until said particles are saturated with the straight-chain hydrocarbons, said particles having admixed therewith a plurality of granular, refractory, heat-transfer particles; (2) flushing the unadsorbed constituents of said admixture from said first zone with a cool, liquid, hydrocarbon, flushing oil at a temperature within the range of about 100° to 140° F. and having an initial boiling point less than the end boiling point of the highest boiling hydrocarbon in said admixture and being substantially non-adsorbable by said zeolite particles; (3) recovering the branched-chain hydrocarbons from admixture with said flushing oil; (4) passing cool, flushing oil to a second adsorption zone containing zeolite adsorbent particles which have been freshly regenerated and are at an elevated temperature within the range of about 550° to 650° F. resulting from the regeneration whereby said cool oil is heated to an elevated temperature within the range of about 550° to 650° F. by direct heat exchange with said regenerated zeolite particles for subsequent use as a heat-source oil; (5) regenerating the zeolite adsorbent in said first zone to partially remove the adsorbed straight-chain hydrocarbon constituents of said admixture by contacting the admixture of heat-transfer particles and said adsorbent with said heat-source oil at an elevated temperature within the range of about 550° to 650° F. and subsequently depressurizing the adsorption zone containing said admixture to a subatmospheric pressure; and (6) thereafter cooling said regenerated zeolite adsorbent particles in said first zone to a temperature within the range of about 100° to 140° F. by contacting said zeolite particles with a cooling oil, said flushing oil, heat-source oil and cooling oil having substantially the same composition.

11. The method of separating a hydrocarbon mixture containing straight-chain and branched-chain paraffins into at least two fractions, one of which is richer in straight-chain and the other of which is richer in branched-chain paraffins than the said mixture comprising (1) contacting said mixture in a first stage of a plural stage adsorption system with zeolite under conditions of temperature and pressure conducive to selective adsorption of straight-chain paraffins, (2) continuing said contacting until the zeolite in said first stage has substantially exhausted its capacity to adsorb straight-chain paraffins, (3) flushing from said first stage branched-chain paraffins by means of cool oil less adsorbable in said zeolite than straight-chain hydrocarbons and having an initial boiling point not substantially below the end boiling point of said branched-chain paraffins, (4) separating said cool oil from branched-chain paraffins in a separate fractionation zone, cooling and continuously recycling said oil to a cool exhausted adsorption stage to flush branched-chain hydrocarbons therefrom, and to a separate hot regenerated stage to cool it to a temperature suitable for the selective adsorption of straight-chain paraffins, (5) simultaneously with the circulation of said cool oil circulating hot oil, from a separate body of hot oil of substantially the same composition as said cool oil, through said first stage subsequent to step (3) until the zeolite in said stage is regenerated for further adsorption of straight-chain paraffins, (6) separating said hot oil and absorbed straight-chain paraffins in a separate fractionation zone, (7) returning oil from said last mentioned separation zone to said separate body of hot oil and (8) passing cool oil from an adsorption zone where it has been used to wash out branched-chain hydrocarbons, through a stage which has just been regenerated with hot oil in order to heat said cold oil prior to passing it to said separate fractionating zone for branched-chain hydrocarbons.

12. The method in accordance with claim 11 in which cool oil is contacted with the zeolite in a hot adsorption zone which has just been regenerated in order to heat said oil prior to charging to an exhausted regenerated zone.

References Cited in the file of this patent

UNITED STATES PATENTS

| 2,599,545 | Egan et al. | June 10, 1952 |
| 2,621,149 | Scott et al. | Dec. 9, 1952 |
| 2,818,455 | Ballard et al. | Dec. 31, 1957 |